(12) United States Patent
Kim et al.

(10) Patent No.: US 9,229,875 B2
(45) Date of Patent: Jan. 5, 2016

(54) METHOD AND SYSTEM FOR EXTENDING VIRTUAL ADDRESS SPACE OF PROCESS PERFORMED IN OPERATING SYSTEM

(71) Applicant: ELECTRONICS AND TELECOMMUNICATIONS RESEARCH INSTITUTE, Daejeon (KR)

(72) Inventors: Ik Soon Kim, Daejeon (KR); Sun Ja Kim, Daejeon (KR); Chae Kyu Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 14/056,057

(22) Filed: Oct. 17, 2013

(65) Prior Publication Data

US 2014/0108767 A1    Apr. 17, 2014

(30) Foreign Application Priority Data

Oct. 17, 2012  (KR) .................. 10-2012-0115111
Sep. 23, 2013  (KR) .................. 10-2013-0112512

(51) Int. Cl.
*G06F 3/00*    (2006.01)
*G06F 5/00*    (2006.01)
*G06F 12/10*   (2006.01)

(52) U.S. Cl.
CPC ..................................... *G06F 12/10* (2013.01)

(58) Field of Classification Search
None
See application file for complete search history.

(56) References Cited

U.S. PATENT DOCUMENTS

| | | | |
|---|---|---|---|
| 5,295,251 A | 3/1994 | Wakui | |
| 5,511,206 A * | 4/1996 | Yasuda | ....... G06F 9/22 711/203 |
| 5,826,057 A | 10/1998 | Okamoto | |
| 5,873,120 A * | 2/1999 | Harvey | ....... G06F 9/5016 711/173 |
| 5,978,892 A * | 11/1999 | Noel et al. | ....... 711/170 |
| 6,061,773 A * | 5/2000 | Harvey et al. | ....... 711/206 |
| 7,296,139 B1 * | 11/2007 | Case et al. | ....... 711/209 |
| 7,802,066 B2 * | 9/2010 | Paladini et al. | ....... 711/158 |
| 2005/0033934 A1 * | 2/2005 | Paladini | ....... G06F 12/123 711/170 |
| 2005/0055419 A1 * | 3/2005 | Oh | ....... 709/213 |
| 2005/0114619 A1 * | 5/2005 | Matsuo et al. | ....... 711/170 |
| 2005/0132161 A1 * | 6/2005 | Makela et al. | ....... 711/170 |
| 2006/0117130 A1 * | 6/2006 | Tsushima | ....... G06F 9/45558 711/6 |
| 2008/0177974 A1 * | 7/2008 | Chiang | ....... G06F 12/1036 711/173 |

* cited by examiner

*Primary Examiner* — Michael Sun
(74) *Attorney, Agent, or Firm* — LRK Patent Law Firm

(57) ABSTRACT

A method of extending a virtual address space of a process executed in an operating system includes selecting a virtual address range included in a virtual address space corresponding to the process and the number of a plurality of extended virtual address ranges, extending and thereby setting the virtual address space to a multi-virtual address space based on the selected virtual address range and the selected number of the plurality of extended virtual address ranges, and providing the multi-virtual address space to the process.

12 Claims, 4 Drawing Sheets

METHOD AND SYSTEM FOR EXTENDING VIRTUAL ADDRESS SPACE OF PROCESS PERFORMED IN OPERATING SYSTEM

CROSS-REFERENCE TO RELATED APPLICATIONS

This application claims the priority benefit of Korean Patent Application No. 10-2012-0115111, filed on Oct. 17, 2012, and Korean Patent Application No. 10-2013-0112512, filed on Sep. 23, 2013, in the Korean Intellectual Property Office, the disclosures of which are incorporated herein by reference.

BACKGROUND

1. Field of the Invention

The present invention relates to a method and system for extending a virtual address space of a process executed in an operating system, and more particularly, to a technology of extending a linear virtual address space of a process to a multi-virtual address space including a plurality of linear virtual address spaces.

2. Description of the Related Art

With the current development in a hardware process technology, a memory capacity is increasing and accordingly, an in-memory computing method of maximizing the use of an increased memory is being utilized.

However, a sudden increase in the memory capacity may require a further extended address space compared to a linear virtual address space supportable at a process. Accordingly, there is a need for a method of extending a single linear virtual address space assigned to a process.

SUMMARY

According to an aspect of the present invention, there is provided a method of extending a virtual address space of a process executed in an operating system, the method including: selecting a virtual address range included in a virtual address space corresponding to the process and the number of a plurality of extended virtual address ranges; extending and thereby setting the virtual address space to a multi-virtual address space based on the selected virtual address range and the selected number of the plurality of extended virtual address ranges; and providing the multi-virtual address space to the process.

The extending and thereby setting may include: generating the plurality of extended virtual address ranges corresponding to the selected virtual address range based on the selected number of the plurality of extended virtual address ranges; and setting the multi-virtual address space including the plurality of extended virtual address ranges.

The selecting may include providing a user application programming interface (API) of selecting the virtual address range and the number of the plurality of extended virtual address ranges.

The method of extending a virtual address space of a process executed in an operating system may further include: determining, from the provided multi-virtual address space, a predetermined virtual address range in which the process is to be executed; and executing the process based on the predetermined virtual address range.

The determining may include changing an address of a page table of the virtual address range corresponding to the process with an address of a page table corresponding to the predetermined virtual address range.

The determining may further include providing a user API of determining, from the provided multi-virtual address space, the predetermined virtual address range in which the process is to be executed.

The method of extending a virtual address space of a process executed in an operating system may further include cancelling the set multi-virtual address space.

The cancelling may include providing a user API of cancelling the set multi-virtual address space.

According to another aspect of the present invention, there is provided a system for extending a virtual address space of a process executed in an operating system, the system including: a selector to select a virtual address range included in a virtual address space corresponding to the process and the number of a plurality of extended virtual address ranges; a setting unit to extend and thereby set the virtual address space to a multi-virtual address space based on the selected virtual address range and the selected number of the plurality of extended virtual address ranges; and a provider to provide the multi-virtual address space to the process.

The setting unit may generate the plurality of extended virtual address ranges corresponding to the selected virtual address range based on the selected number of the plurality of extended virtual address ranges, and may set the multi-virtual address space including the plurality of extended virtual address ranges.

The system for extending a virtual address space of a process executed in an operating system may further include: a determiner to determine, from the provided multi-virtual address space, a predetermined virtual address range in which the process is to be executed; and an executor to execute the process based on the predetermined virtual address range.

The system for extending a virtual address space of a process executed in an operating system may further include: a cancellation unit to cancel the set multi-virtual address space.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
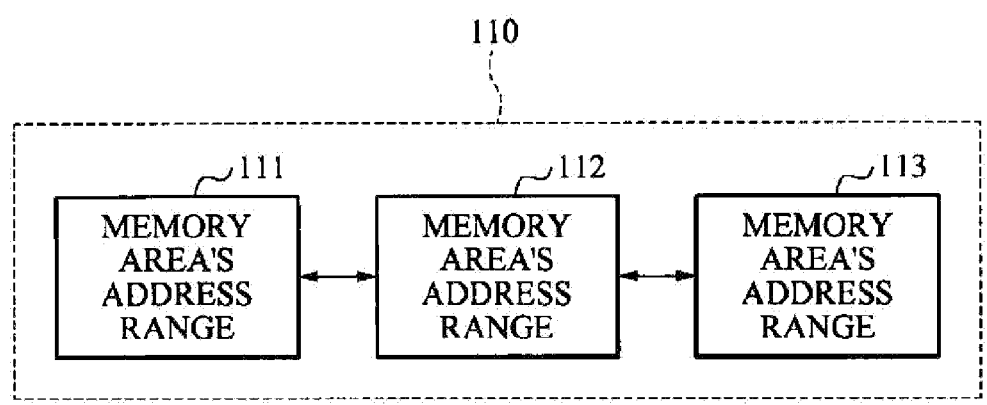
FIG. 1 is a diagram illustrating a virtual address space of, a process executed in an operating system according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a virtual address space 110 of a process executed in an operating system according to a related art.

Referring to FIG. 1, the virtual address space 110 of the process may have a linear virtual address space. For example, an existing operating system may provide only a single linear virtual address space. The virtual address space 110 may include a plurality of memory area's address ranges 111, 112, and 113 indicating different memory areas. Hereinafter, a memory area's address range will be referred to as a virtual address range and thus, the memory area's address ranges 111, 112, and 113 will be referred to as virtual address ranges 111, 112, and 113. For example, the virtual memory range 111 of a first memory area, the virtual address range 112 of a second memory area, and a virtual address range 113 of a third memory area may be provided to a single process.

In a case in which a physical address space and the virtual address space 110 are distinguished from each other and thereby used, and the virtual address space 110 is set to be used in a central processing unit (CPU), the existing operating system may perform a memory operation by converting a virtual address to a physical address and then connecting to the physical address in the case of executing a process. A process of converting the virtual address to the physical address may be performed using a hardware module including a memory management unit (MMU). Also, a process of converting the virtual address to the physical address may be performed using a conversion table including a page table. Here, the page table may include address mapping information used to map a virtual address of a predetermined process and a physical address corresponding thereto.

Also, the existing operating system may support a multi-tasking method in which a plurality of processes is simultaneously executed. In this example, in a case in which context switching from a process being executed to a new process different from the process being executed occurs, a context switching process needs to be performed based on address mapping information suitable for the new process. During the context switching process, an operation of storing all of the context information of the process being executed and restoring context information of the new process may need to be performed and thus, an overhead may occur.

Also, the existing operating system may support a thread that is a light weight process. Even though a plurality of threads generated in a single process shares the same virtual address space 110, a process execution location of each of the plurality of threads differs. Accordingly, in a case in which switching occurs between the plurality of threads, execution locations of the threads need to be traced.

Accordingly, a method of physically extending a size of a memory address accessible by CPUs is proposed. However, in a case in which a size of a memory address of a CPU physically increases, a size of a CPU instruction and a size of a pointer variable may also increase and thus, an overhead in which a size of data and the process increases may occur.

Accordingly, proposed is a method of extending a virtual address space available by a process by providing a multi-virtual address space to a single process. Hereinafter, it will be further described.

Figure 2:
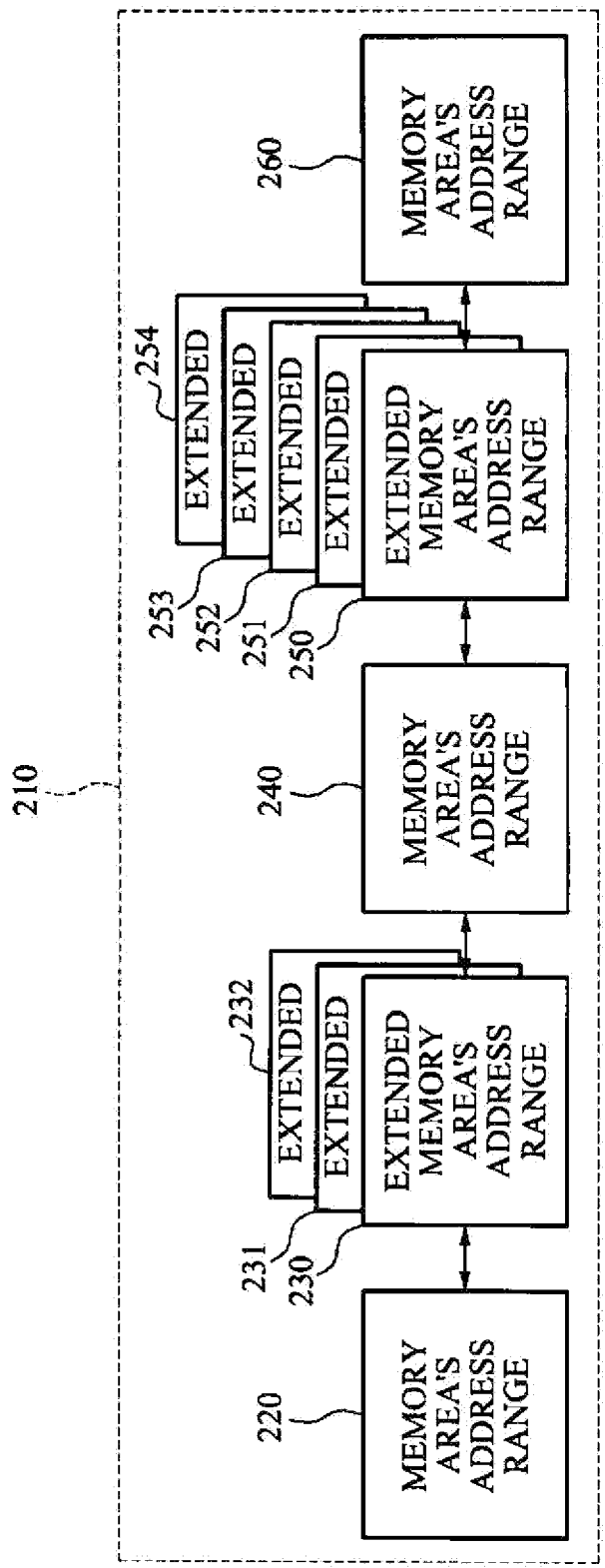
FIG. 2 is a diagram illustrating a multi-virtual address space of a process according to an embodiment of the present invention.

FIG. 2 is a diagram illustrating a multi-virtual address space 210 of a process according to an embodiment of the present invention.

Referring to FIG. 2, the multi-virtual address space 210 of the process may include a plurality of virtual address ranges 220, 240, and 260, and a plurality of extended virtual address ranges 230, 231, and 232, and 250, 251, 252, 253, and 254, which differs from a single virtual address space of a process provided from an existing operating system. Here, each of the plurality of extended virtual address ranges 230, 231, and 232, or 250, 251, 252, 253, and 254 may be generated from a single virtual address range, for example, the virtual address range 230 or 250, selected from among the virtual address ranges 220, 230, 240, 250, and 260.

For example, the operating system may generate the multi-virtual address space 210 by selecting a virtual address range to be extended and the number of extended virtual address ranges to be generated.

Specifically, a process of selecting a virtual address range to be extended and the number of extended virtual address ranges to be generated may be performed by providing a user with a user application programming interface (API) of selecting the virtual address range to be extended and the number of extended virtual address ranges to be generated, and by receiving a selection of the user on the virtual address range to be extended and the number of extended virtual address ranges to be generated. Referring to FIG. 2, the operating system may generate the multi-virtual address space 210 including the extended virtual address ranges 230, 231, and 232, or 250, 251, 252, 253, and 254 by generating the extended virtual address ranges 230, 231, and 232, or 250, 251, 252, 253, and 254 corresponding to the virtual address range 230 or 250 to be extended based on the selected number of extended virtual address ranges 230, 231, and 232, or 250, 251, 252, 253, and 254 to be generated.

The operating system may provide the generated multi-virtual address space 210 to the process, and may determine a predetermined virtual address range in which the process is to be executed among the plurality of extended virtual address ranges 230, 231, and 232, and 250, 251, 252, 253, and 254, and the virtual address range, 220, 240, and 260 included in the provided multi-virtual address space 210. For example, the operating system may determine a predetermined virtual address range in which a process is to be executed by providing a user API of determining the predetermined virtual address range in which the process is to be executed. Specifically, a process of determining a predetermined virtual address range may be performed by changing an address of a page table of a virtual address range corresponding to the process with an address of a page table corresponding to the predetermined virtual address range. Referring to FIG. 2, the extended virtual address range 231 or 253 be determined as the predetermined virtual address range in which the process is to be executed among the extended virtual address ranges 230, 231, and 232, or 250, 251, 252, 253, and 254.

Also, the operating system may execute the process based on the determined predetermined virtual address range and may cancel the set multi-virtual address space 210. For example, the operating system may cancel the set multi-virtual address space 210 by providing a user API of cancelling a multi-virtual address space and receiving a cancellation request from a user.

Figure 3:
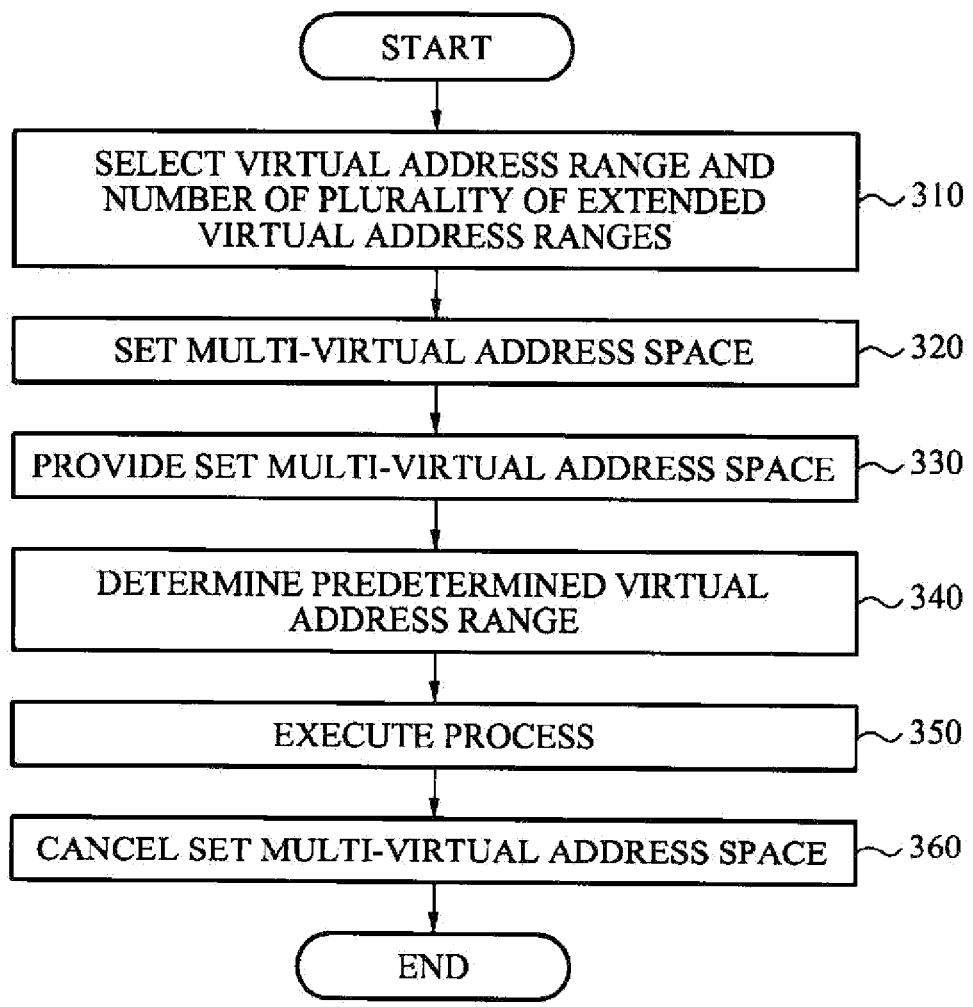
FIG. 3 is a flowchart illustrating a method of extending a virtual address space of a process according to an embodiment of the present invention.

FIG. 3 is a flowchart illustrating a method of extending a virtual address space of a process according, to an embodiment of the present invention.

Referring to FIG. 3, in operation 310, a system for extending a virtual address space may select a virtual address range included in a virtual address space corresponding to the process and the number of a plurality of extended virtual address ranges. Here, a process of selecting the virtual address range and the number of extended virtual address ranges may include a process of providing a user API of selecting the virtual address range to be extended and the number of the plurality of extended virtual address ranges to be generated.

In operation 320, the system for extending a virtual address space may extend and thereby set the virtual address space to a multi-virtual address space based on the selected virtual address range and the selected number of the plurality of extended virtual address ranges. A process of extending and thereby setting the virtual address space to a multi-virtual address space based on the selected virtual address range and the selected number of the plurality of extended virtual address ranges may include a process of generating the plurality of extended virtual address ranges corresponding to the selected virtual address range based on the selected number of the plurality of extended virtual address ranges, and a process of setting the multi-virtual address space including the plurality of extended virtual address ranges.

In operation 330, the system for extending a virtual address space may provide the set multi-virtual address space to the process.

In operation 340, the system for extending a virtual address space may determine, from the provided multi-virtual address space, a predetermined virtual address range in which the process is to be executed. Here, a process of determining the predetermined virtual address range may include a process of changing an address of a page table of the virtual address range corresponding to the process with an address of a page table corresponding to the predetermined virtual address range. A process of determining the predetermined virtual address range may include a process of providing a user API of determining, from the provided multi-virtual address space, the predetermined virtual address range in which the process is to be executed.

In operation 350, the system for extending a virtual address space may execute the process based on the predetermined virtual address range.

In operation 360, the system for extending a virtual address space may cancel the set multi-virtual address space. A process of cancelling the set multi-virtual address space may include a process of providing a user API of cancelling the set multi-virtual address space.

Figure 4:
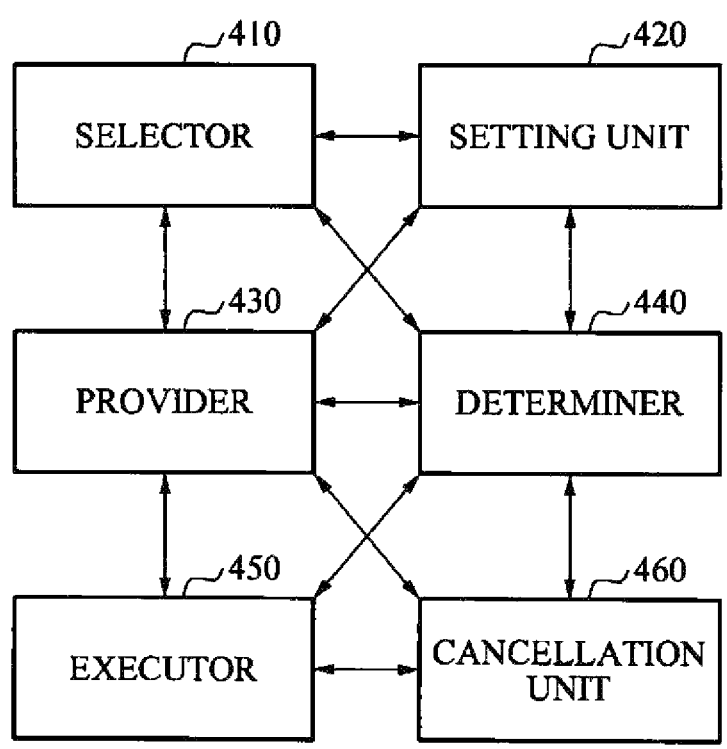
FIG. 4 is a block diagram illustrating a system for extending a virtual address space of a process according to an embodiment of the present invention.

FIG. 4 is a block diagram illustrating a system for extending a virtual address space of a process according to an embodiment of the present invention.

Referring to FIG. 4, the system for extending a virtual address space may include a selector 410, a setting unit 420, a provider 430, a determiner 440, an executor 450, and a cancellation unit 460.

The selector 410 may select a virtual address range included in a virtual address space corresponding to the process and the number of a plurality of extended virtual address ranges.

The setting unit 420 may extend and thereby set the virtual address space to a multi-virtual address space based on the selected virtual address range and the selected number of the plurality of extended virtual address ranges.

Here, the setting unit 420 may generate the plurality of extended virtual address ranges corresponding to the selected virtual address range based on the selected number of the plurality of extended virtual address ranges, and may set the multi-virtual address space including the plurality of extended virtual address ranges.

The provider 430 may provide the multi-virtual address space to the process.

The determiner 440 may determine, from the provided multi-virtual address space, a predetermined virtual address range in which the process is to be executed.

The executor 450 may execute the process based on the predetermined virtual address range.

The cancellation unit 460 may cancel the set multi-virtual address space.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of extending a virtual address space of a process executed in an operating system where the virtual address space includes a plurality of virtual address ranges, the method comprising:
   selecting a virtual address range to be extended from among the plurality of virtual address ranges included in the virtual address space corresponding to the process and selecting a number of a plurality of extended virtual address ranges; to be generated with respect to the selected virtual address range;
   extending and thereby setting the virtual address space to a multi-virtual address space based on the selected virtual address range and the selected number of the plurality of extended virtual address ranges; and
   providing the multi-virtual address space to the process.

2. The method of claim 1, wherein the extending and thereby setting comprises:
   generating the plurality of extended virtual address ranges corresponding to the selected virtual address range based on the selected number of the plurality of extended virtual address ranges; and
   setting the multi-virtual address space comprising the plurality of extended virtual address ranges.

3. The method of claim 1, wherein the selecting comprises providing a user application programming interface (API) of selecting the virtual address range and the number of the plurality of extended virtual address ranges.

4. The method of claim 1, further comprising:
   determining, from the provided multi-virtual address space, a predetermined virtual address range in which the process is to be executed; and
   executing the process based on the predetermined virtual address range.

5. The method of claim 4, wherein the determining comprises changing an address of a page table of the virtual address range corresponding to the process with an address of a page table corresponding to the predetermined virtual address range.

6. The method of claim 4, wherein the determining further comprises providing a user API of determining, from the provided multi-virtual address space, the predetermined virtual address range in which the process is to be executed.

7. The method of claim 1, further comprising:
   cancelling the set multi-virtual address space.

8. The method of claim 7, wherein the cancelling comprises providing a user API of cancelling the set multi-virtual address space.

9. A system for extending a virtual address space of a process executed in an operating system where the virtual address space includes a plurality of virtual address ranges, the system comprising:
   a selector to select a virtual address range to be extended from among the plurality of virtual address ranges included in the virtual address space corresponding to the process and select a number of a plurality of extended virtual address ranges to be generated with respect to the selected virtual address range;
   a setting unit to extend and thereby set the virtual address space to a multi-virtual address space based on the selected virtual address range and the selected number of the plurality of extended virtual address ranges; and
   a provider to provide the multi-virtual address space to the process.

10. The system of claim 9, wherein the setting unit generates the plurality of extended virtual address ranges corresponding to the selected virtual address range based on the selected number of the plurality of extended virtual address ranges, and sets the multi-virtual address space comprising the plurality of extended virtual address ranges.

11. The system of claim 9, further comprising:
   a determiner to determine, from the provided multi-virtual address space, a predetermined virtual address range in which the process is to be executed; and
   an executor to execute the process based on the predetermined virtual address range.

12. The system of claim 9, further comprising:
   a cancellation unit to cancel the set multi-virtual address space.

* * * * *